US012795308B2

(12) United States Patent
Sabin et al.

(10) Patent No.: US 12,795,308 B2
(45) Date of Patent: Nov. 10, 2026

(54) SYSTEMS AND METHODS FOR ADAPTING AUDIO CAPTURED BY BEHIND-THE-EAR MICROPHONES

(71) Applicant: Bose Corporation, Framingham, MA (US)

(72) Inventors: Andrew Todd Sabin, Chicago, IL (US); Carl R. Jensen, Waltham, MA (US); Dale McElhone, Marlborough, MA (US); Liam Robert Kelly, Dorchester, MA (US)

(73) Assignee: Bose Corporation, Framingham, MA (US)

( * ) Notice: Subject to any disclaimer, the term of this patent is extended or adjusted under 35 U.S.C. 154(b) by 149 days.

(21) Appl. No.: 18/728,742

(22) PCT Filed: Jan. 12, 2023

(86) PCT No.: PCT/US2023/010701
§ 371 (c)(1),
(2) Date: Jul. 12, 2024

(87) PCT Pub. No.: WO2023/137126
PCT Pub. Date: Jul. 20, 2023

(65) Prior Publication Data

US 2025/0088811 A1 Mar. 13, 2025

Related U.S. Application Data

(60) Provisional application No. 63/266,785, filed on Jan. 14, 2022.

(51) Int. Cl.
*H04R 25/00* (2006.01)

(52) U.S. Cl.
CPC ......... *H04R 25/505* (2013.01); *H04R 25/407* (2013.01); *H04R 25/453* (2013.01); (Continued)

(58) Field of Classification Search
CPC ................ H04R 25/407; H04R 25/453; H04R 25/505; H04R 25/552; H04R 25/604; (Continued)

(56) References Cited

U.S. PATENT DOCUMENTS 9,148,735 B2 * 9/2015 Ma ........................ H04R 25/453
2014/0348360 A1 * 11/2014 Gran ...................... H04R 25/50 381/318
2020/0107137 A1 * 4/2020 Koutrouli ............ H04R 25/407

* cited by examiner

*Primary Examiner* — Huyen D Le

(57) ABSTRACT

A wearable audio device, such as a hearing aid is provided. The wearable audio device includes a BTE microphone, a front-of-ear microphone, an adaptive filter, a subtractor circuit, and an acoustic transducer. The BTE microphone generates a BTE microphone signal. The BTE microphone may be arranged behind an ear of a user. The front-of-ear microphone generates a front-of-ear microphone signal. The front-of-ear microphone may be arranged within an ear canal or a concha of the ear of the user. The adaptive filter generates an adapted signal based on the BTE microphone signal and an error signal. The subtractor circuit generates the error signal based on the adapted signal and the front-of-ear microphone signal. The acoustic transducer generates audio based on the adapted signal. In some examples, the wearable audio device includes a plurality of BTE microphones configured as a directional microphone array.

16 Claims, 5 Drawing Sheets

(52) U.S. Cl.
CPC ......... *H04R 25/552* (2013.01); *H04R 25/604* (2013.01); *H04R 2225/021* (2013.01); *H04R 2225/0216* (2019.05); *H04R 2225/43* (2013.01); *H04R 2410/01* (2013.01)

(58) Field of Classification Search
CPC ...... H04R 2225/021; H04R 2225/0216; H04R 2225/43; H04R 2410/01
See application file for complete search history.

SYSTEMS AND METHODS FOR ADAPTING AUDIO CAPTURED BY BEHIND-THE-EAR MICROPHONES

BACKGROUND

Aspects and implementations of the present disclosure are generally directed to systems, devices, and methods for adapting audio captured by behind-the-car (BTE) microphones.

BTE hearing aids are the most commonly available hearing aid type. BTE hearing aids typically include one or more microphones arranged behind the ear of the wearer. The sound captured by the BTE microphones will be processed (amplified, filtered, equalized, etc.) and then played for the wearer via an acoustic transducer. However, the sound received behind the car of the wearer will vary somewhat from the sound naturally received at the wearer's ear canal. This variation occurs due to the position and orientation of the car canal, as well as the geometry and physical properties of the wearer's ear.

Further, some BTE hearing aids include microphones positioned within the car canal or the concha of the user. The microphones may be referred to as feed-forward microphones, and may be used for noise cancellation purposes. While a feed-forward microphone is better positioned to capture sound naturally received by the wearer's ear canal, acoustically coupling the feed-forward microphone to the acoustic transducer can result in undesirable audio feedback, such as howling or squealing. Accordingly, there is a need to adapt audio captured by BTE hearing aids to sound closer to sound naturally received by a wearer's ear canal.

SUMMARY

The present disclosure provides systems, devices, and methods for adapting audio captured by behind-the-car (BTE) microphones. More specifically, the systems, methods, and devices utilize sound captured by a front-of-car microphone (arranged in the car canal or concha of the user) to dynamically adapt sound captured by one or more BTE microphones. The adapted sound is then provided to audio processing circuitry for playback by an acoustic transducer. This adaptation is particularly beneficial to high frequency sound spectra susceptible to losses due to the physical properties of the wearer's ear and head.

In some examples, the device is embodied as a wearable audio device, such as a BTE hearing aid. The device includes a BTE microphone and a front-of-ear microphone. When the device is worn by a user, the BTE microphone is positioned behind a pinna of an car of the user, while the front-of-car microphone is positioned within the car canal or the concha of the car. The BTE microphone generates a BTE microphone signal corresponding to sound received behind the user's car. Similarly, the front-of-car microphone generates a front-of-car microphone signal corresponding to sound received in the user's ear canal or concha. The BTE microphone signal is provided to an adaptive filter, such as a least mean squares (LMS) filter. The adaptive filter generates an adapted signal based on the BTE microphone signal and an error signal. The error signal is generated by a subtractor circuit, and represents the difference between the adapted signal generated by the adaptive filter and the front-of-car microphone signal generated by the front-of-car microphone. The adaptive filter adjusts the adapted signal to minimize the error signal, thus compensating for differences between the BTE microphone signal and the front-of-ear microphone signal. This adapted signal is then provided to audio processing circuitry (including components such as filters, amplifiers, equalizers, etc.). The processed adapted signal is then played by the acoustic transducer for the user to hear.

In some examples, two or more BTE microphones are used, such as in a directional microphone array. Each BTE microphone generates a corresponding BTE microphone signal. The BTE microphone signals may be combined (such as via a fixed filter or mixer) prior or subsequent to adjustment by the adaptive filter.

Generally, in one aspect, a wearable audio device is provided. The wearable audio device is a hearing aid. The wearable audio device includes a BTE microphone. The BTE microphone is configured to generate a BTE microphone signal. The BTE microphone may be arranged behind an car of a user.

The wearable audio device further includes a front-of-car microphone. The front-of-car microphone is configured to generate a front-of-car microphone signal. The front-of-car microphone may be arranged within an car canal or a concha of the user.

The wearable audio device further includes an adaptive filter. The adaptive filter is configured to generate an adapted signal. The adapted signal is based on the BTE microphone signal and an error signal.

The wearable audio device further includes a subtractor circuit. The subtractor circuit is configured to generate the error signal. The error signal is based on the adapted signal and the front-of-car microphone signal.

The wearable audio device further includes an acoustic transducer. The acoustic transducer is configured to generate audio based on the adapted signal.

According to an example, the wearable audio device further includes a second BTE microphone. The second BTE microphone is configured to generate a second BTE microphone signal. The second BTE microphone may be arranged behind an car of a user. The adaptive filter may be further configured to generate a second adapted signal. The second adapted signal may be based on the second BTE microphone signal and a second error signal. Further to this example, the wearable audio device may further include a second subtractor circuit. The second subtractor circuit may be configured to generate the second error signal. The second error signal may be based on the second adapted signal and the front-of-car microphone signal. The audio generated by the acoustic transducer may further based on the second adapted signal.

Generally, in another aspect, a wearable audio device is provided. The wearable audio device includes a first BTE microphone. The first BTE microphone is configured to generate a first BTE microphone signal.

The wearable audio device further includes a second BTE microphone. The second BTE microphone is configured to generate a second BTE microphone signal. According to an example, the first BTE microphone and the second BTE microphone are arranged as a directional microphone array.

The wearable audio device further includes a fixed filter. The fixed filter is configured to generate a microphone array signal. The microphone array signal is based on the first BTE microphone signal and the second BTE microphone signal.

The wearable audio device further includes a front-of-car microphone. The front-of-car microphone is configured to generate a front-of-car microphone signal.

The wearable audio device further includes an adaptive filter. The adaptive filter is configured to generate an adapted signal. The adapted signal is based on the microphone array signal and an error signal.

The wearable audio device further includes a subtractor circuit. The subtractor circuit is configured to generate the error signal. The error signal is based on the adapted signal and the front-of-car microphone signal.

The wearable audio device further includes an acoustic transducer. The acoustic transducer is configured to generate audio based on the adapted signal.

Generally, in another aspect, a method for capturing and processing audio with a wearable audio device is provided. The method includes generating a front-of-car microphone signal. The front-of-car microphone signal is generated via a front-of-ear microphone. The front-of-car microphone is arranged on the wearable audio device.

The method further includes generating an adapted signal. The adapted signal is generated via an adaptive filter. The adapted signal is based on a BTE audio signal and an error signal. The error signal is generated by a subtractor circuit. The error signal is based on the adapted signal and the front-of-ear microphone signal. The BTE audio signal corresponds to sound captured by one or more BTE microphones arranged on the wearable audio device.

In one example, the BTE audio signal is a first BTE microphone signal generated by a first BTE microphone. In an alternative example, the BTE audio signal is a microphone array signal generated by a fixed filter. The fixed filter may generate the microphone array signal based on a first BTE microphone signal and a second BTE microphone signal. The first BTE microphone signal may be generated by a first BTE microphone. The second BTE microphone signal may be generated by the second BTE microphone.

The method further includes generating audio corresponding to the adapted signal. The audio is generated via an acoustic transducer. The acoustic transducer is arranged on the wearable audio device.

In various implementations, a processor or controller can be associated with one or more storage media (generically referred to herein as "memory," e.g., volatile and non-volatile computer memory such as ROM, RAM, PROM, EPROM, and EEPROM, floppy disks, compact disks, optical disks, magnetic tape, Flash, OTP-ROM, SSD, HDD, etc.). In some implementations, the storage media can be encoded with one or more programs that, when executed on one or more processors and/or controllers, perform at least some of the functions discussed herein. Various storage media can be fixed within a processor or controller or can be transportable, such that the one or more programs stored thereon can be loaded into a processor or controller so as to implement various aspects as discussed herein. The terms "program" or "computer program" are used herein in a generic sense to refer to any type of computer code (e.g., software or microcode) that can be employed to program one or more processors or controllers.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also can appear in any disclosure incorporated by reference should be accorded a meaning most consistent with the particular concepts disclosed herein.

Other features and advantages will be apparent from the description and the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various examples.

DETAILED DESCRIPTION

The present disclosure provides systems, devices, and methods for adapting audio captured by behind-the-ear (BTE) microphones. More specifically, the systems, methods and devices utilize sound captured by a front-of-ear microphone to dynamically adapt sound captured by one or more BTE microphones. The adapted sound is then provided to audio processing circuitry for playback by an acoustic transducer. In some examples, the device is embodied as a wearable audio device. The device includes a BTE microphone and a front-of-ear microphone. The BTE microphone generates a BTE microphone signal corresponding to sound received behind the user's ear. Similarly, the front-of-ear microphone generates a front-of-car microphone signal corresponding to sound received in the user's ear canal or concha. The BTE microphone signal is provided to an adaptive filter. The adaptive filter generates an adapted signal based on the BTE microphone signal and an error signal. The error signal is generated by a subtractor circuit, and represents the difference between the adapted signal generated by the adaptive filter and the front-of-car microphone signal generated by the front-of-car microphone. The adaptive filter adjusts the adapted signal to minimize the error signal, thus compensating for differences between the BTE microphone signal and the front-of-ear microphone signal. This adapted signal is then provided to audio processing circuitry, and played back by the acoustic transducer.

Figure 1:
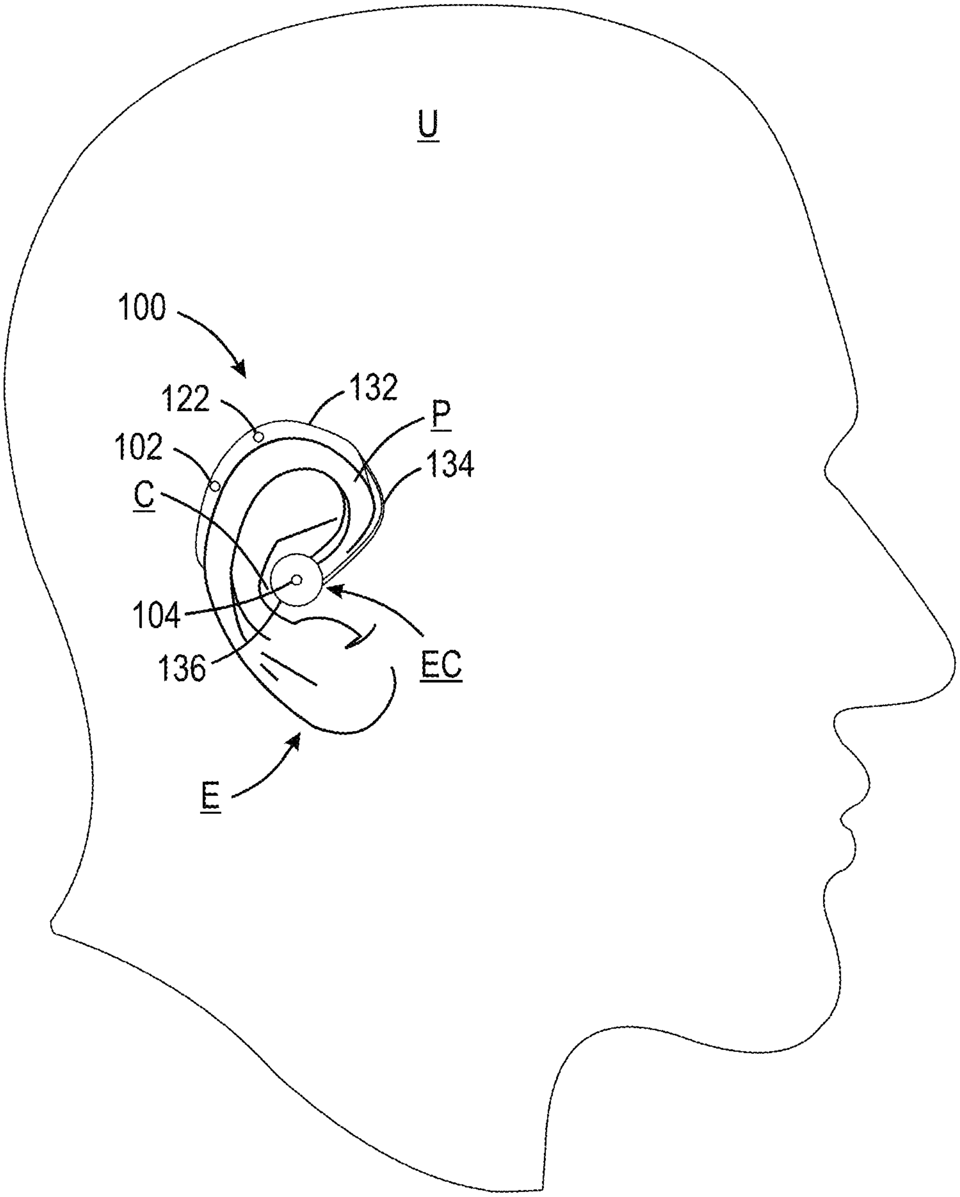
FIG. 1 is an illustration of a wearable audio device worn by a user, according to an example.

FIG. 1 shows a user U with an car E. The car E includes an pinna P, an car canal EC, and a concha C. The user U is wearing a wearable audio device 100 on their ear E. In this example, the wearable audio device 100 is embodied as a BTE hearing aid. The wearable audio device 100 includes a BTE portion 132 positioned behind the pinna P of the car E of the user U. The BTE portion 132 includes a first BTE microphone 102 and a second BTE microphone 122. The BTE microphones 102, 122 are configured to capture sound occurring proximate to the user (such as behind the user's pinna P) for processing by the wearable audio device 100. This processing may include amplifying, filtering, or equalizing the captured sound for the benefit of the user U, and may be performed in any portion of the wearable audio device 100. The components of the BTE portion 132 may be enclosed by a housing of plastic and/or metal.

The BTE portion 132 of the wearable audio device 100 is electrically coupled to a front-of-ear portion 136 via a wire 134. The front-of-ear portion 136 may include a plastic body configured to fit within the ear canal EC or concha C of the user U. The front-of-ear portion 136 includes an acoustic transducer 110 (see FIGS. 2-4), also referred to as an acoustic driver, configured to generate audio 140 (see FIGS. 2-4). The front-of-ear portion 136 further includes a front-of-ear microphone 104. In some situations, the front-of-ear microphone 104 captures sound proximate to the ear canal EC or concha C for noise-cancelling purposes. However, in this example, the front-of-ear microphone 104 is used to compare sound captured proximate to the ear canal EC or concha C to sound captured behind the pinna P. By performing this comparison, the wearable audio device 100 can dynamically adjust the sound provided by the BTE microphones 102, 122 to more closely reflect the sound present at the ear canal EC or concha C.

In other examples, the wearable audio device 100 may be any other audio device with at least one microphone positioned behind the ear E of the user U, and at least one microphone positioned on or near the ear canal EC or concha C of the user. For example, the wearable audio device 100 could be an in-ear monitor or an audio headset.

Figure 2:
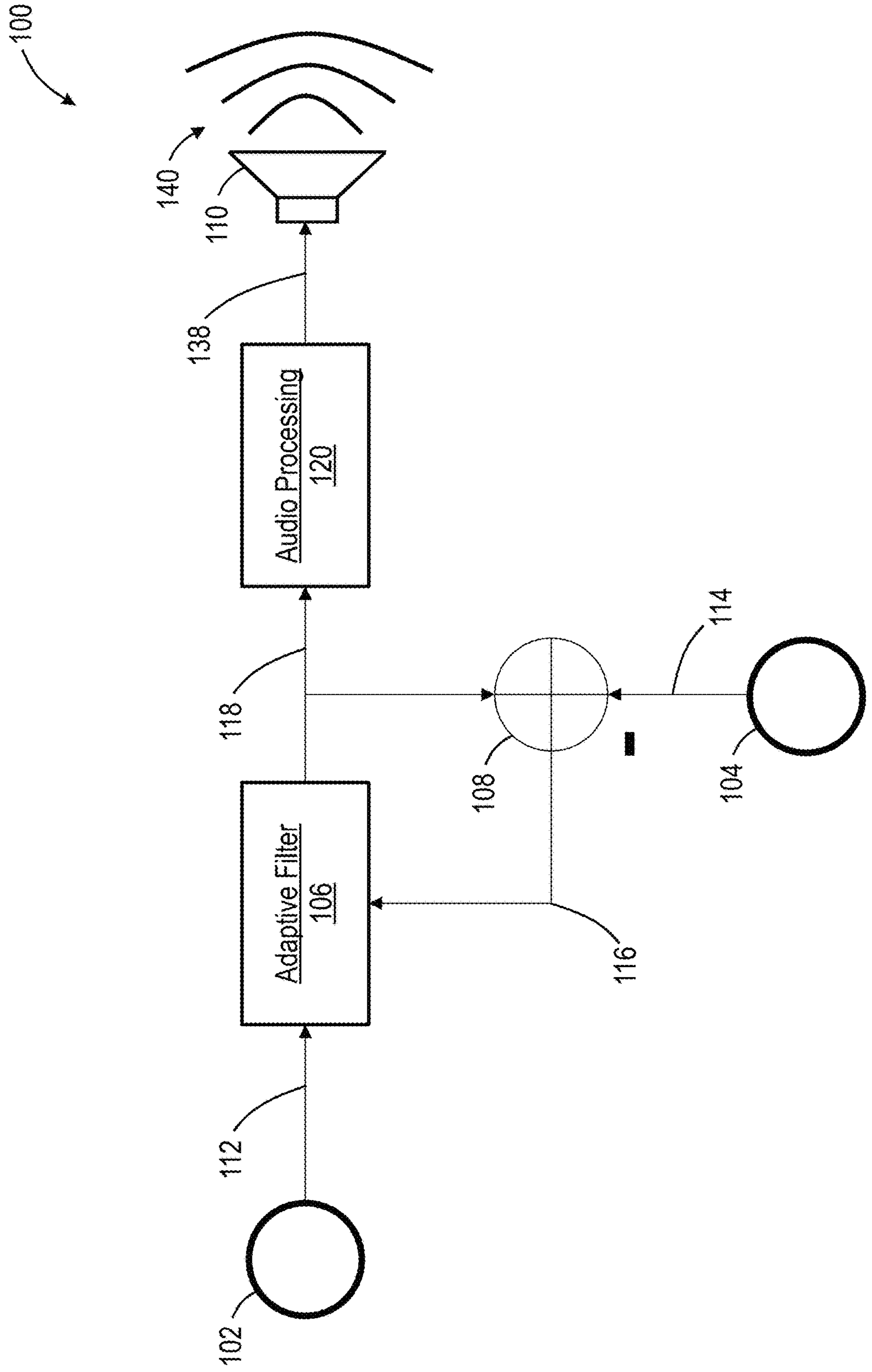
FIG. 2 is a block diagram of a wearable audio device with a single behind-the-ear (BTE) microphone, according to an example.

FIG. 2 shows a functional block diagram of the components of the wearable audio device 100, namely a BTE microphone 102, a front-of-ear microphone 104, an adaptive filter 106, a subtractor circuit 108, audio processing circuitry 120, and an acoustic transducer 110. The BTE microphone 102 captures sound proximate to the area behind the ear E of the user U and generates a corresponding BTE microphone signal 112. Similarly, the front-of-ear microphone 104 captures sound proximate to the ear canal EC or concha C of the user U and generates a front-of-ear microphone signal 114. The microphones 102, 104 may be any microphone-type, such as those commonly found in hearing aids.

In order to modify the BTE microphone signal 112 such that it more closely resembles the front-of-ear microphone signal 114, an adaptive filter 106 is used. In one example, the adaptive filter 106 is a least mean squares (LMS) filter. The adaptive filter 106 receives the BTE microphone signal 112 and an error signal 116. The error signal 116 is generated by the subtractor circuit 108, and is the difference between the front-of-ear microphone signal 114 and the output of the adaptive filter 106, adapted signal 118. The error signal 116 is then fed back to the adaptive filter 106, dynamically adjusting the adaptive filter 106 to produce an adapted signal 118 as close to the front-of-ear microphone signal 114 as possible.

This adapted signal 118 is then provided to the audio processing circuitry 120 for further processing. The audio processing circuitry 120 may include amplifiers, filters, equalizers, or any other applicable components to process the adapted signal 118 prior to playback by the acoustic transducer 110. In a further example, the audio processing circuitry 120 may be dynamically controlled by one or more processors based on data stored in a memory. The processed audio signal 138 generated by the audio processing circuitry 120 is then transformed into audio 140 by the acoustic transducer 110 for the user U to hear. The acoustic transducer 110 may be of any type, such as those commonly found in hearing aids.

In some examples, one or more aspects of the processing are performed by the wearable audio device 100 may be performed remotely. In a further example, the adapted signal 118 or the processed signal 138 may be transmitted to a remote device for playback, such as a smartphone. In this example, the wearable audio device 100 further includes a transceiver configured to wirelessly transmit and/or receive radio frequency (RF) signals.

Figure 3:
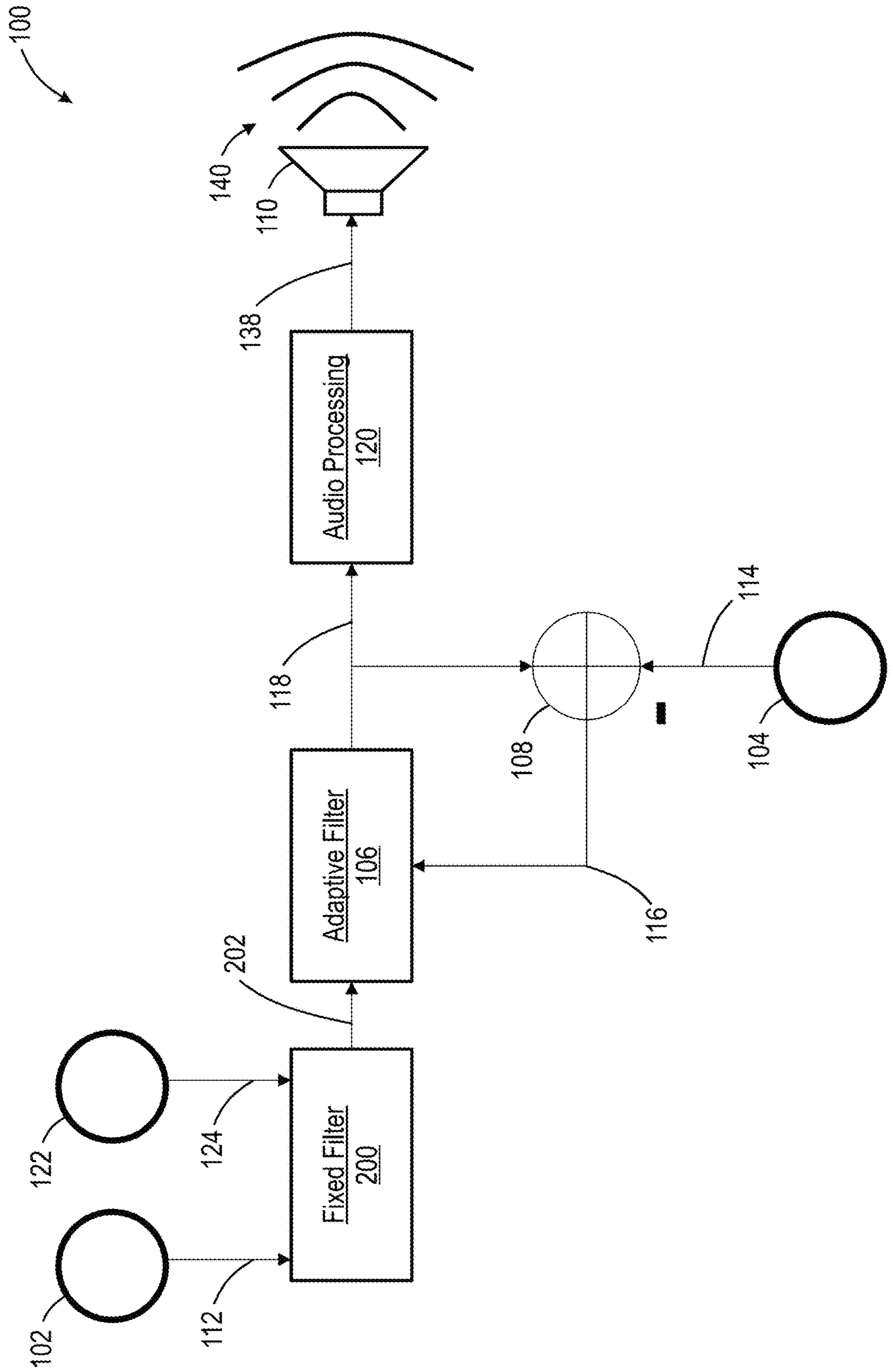
FIG. 3 is a block diagram of a wearable audio device with two BTE microphones, according to an example.

FIG. 3 depicts a variation of the functional block diagram of FIG. 2. In FIG. 3, the wearable audio device 100 includes two BTE microphones, first BTE microphone 102 and second BTE microphone 122. In one example, the BTE microphones 102, 122 may be arranged as a directional microphone array. As in FIG. 2, the first BTE microphone 102 generates a first BTE microphone signal 112. Similarly, the second BTE microphone 122 generates a second BTE microphone signal 124. In further examples, more than two BTE microphones may be used.

A fixed filter 200 receives the first BTE microphone signal 112 and the second BTE microphone signal 124 and generates a corresponding microphone array signal 202. The microphone array signal 202 may be a beamformed signal corresponding to the desired direction of the directional array formed by the BTE microphones 102, 122. The microphone array signal 202 is then provided to the adaptive filter 106. As in FIG. 2, the output of the adaptive filter 106, adapted signal 118, is adjusted according to error signal 116, the difference between the adapted signal 118 and front-of-ear microphone signal 114. The adapted signal 118 is then processed by audio processing circuitry 120, and the processed audio signal 138 is transformed into audio 140 by acoustic transducer 110.

In some cases, the fixed filter 200 can be user adjustable or user selectable to control and/or adjust directionality. For example, the user U may select between an omnidirectional and a directional mode. In omnidirectional mode, the microphone array signal 202 generated by the fixed filter 200 reflects sound captured equally in all directions around BTE microphones 102, 122. In directional mode, the microphone array signal 202 reflects sound captured from a particular direction, such as directly in front of the user U. In some examples, this selection may be made via a software application, such as a mobile application accessed via smartphone. In some further examples, the adaptation of the adaptive filter 106 may be disabled in certain modes. For example, the adaptation may be disabled in omnidirectional mode, but enabled in directional mode.

Figure 4:
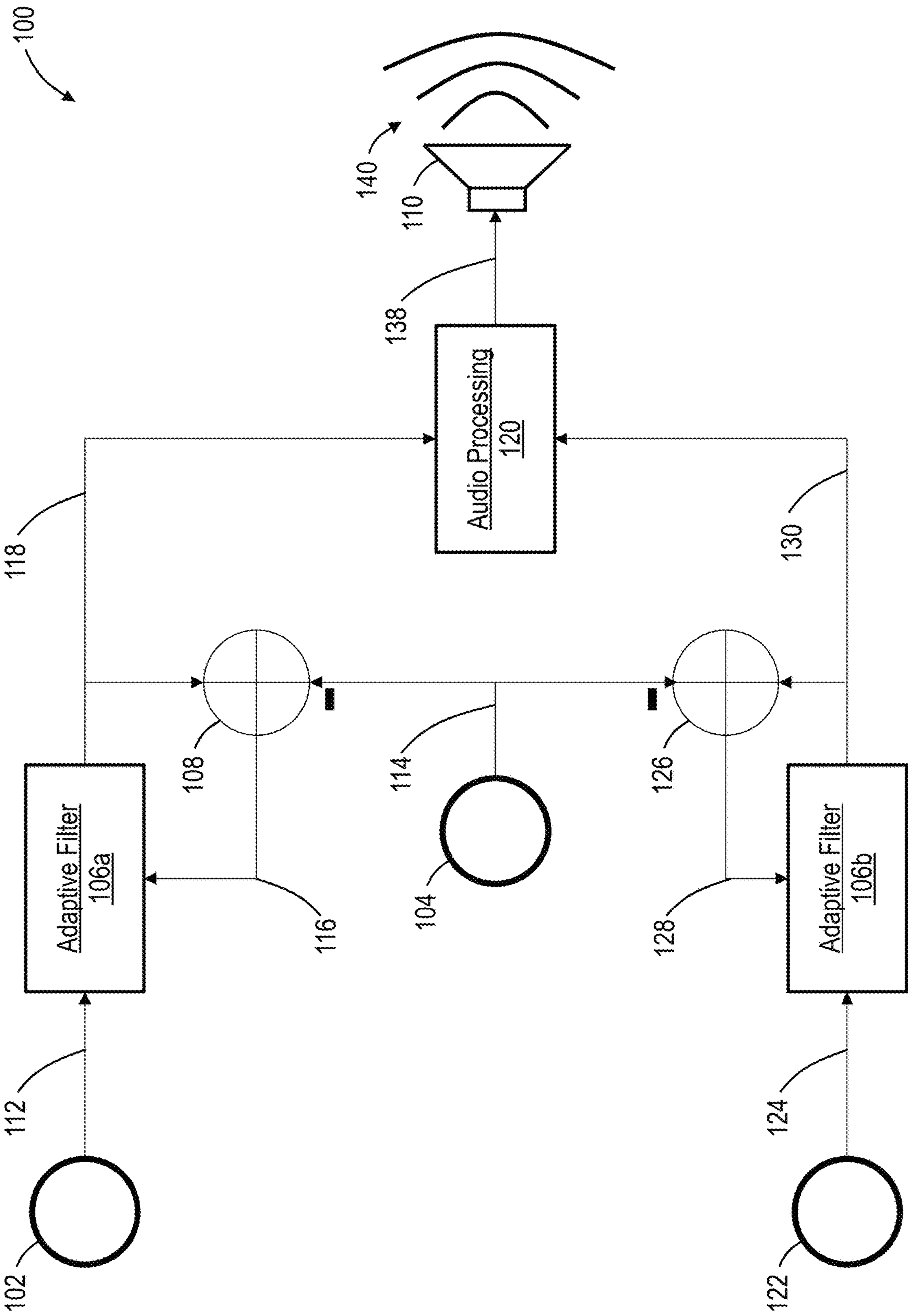
FIG. 4 is a block diagram of a further wearable audio device with two BTE microphones, according to an example.

FIG. 4 depicts a variation of the functional block diagrams of FIGS. 2 and 3. Like FIG. 3, FIG. 4 depicts a wearable audio device 100 with two BTE microphones, a first BTE microphone 102 and a second BTE microphone 122. Further, as in FIG. 2, the first BTE microphone 102 generates a first BTE microphone signal 112, and the second BTE microphone 122 generates a second BTE microphone signal 124. However, unlike FIG. 3, rather than combining the BTE microphone signals 112, 124 into a microphone array signal 202 for further processing, aspects of the adaptive filter 106*a*, 106*b* individually process the BTE microphone signals 112, 124. In one example, the adaptive filter 106*a* and the adaptive filter 106*b* may be arranged in a single component, such as an integrated circuit (IC) chip with multiple processing paths. In other examples, the adaptive filter 106*a* and the adaptive filter 106*b* may be arranged in separate, discrete components.

In one portion of the block diagram, the adaptive filter 106*a* generates a first adapted signal 118. The first adapted signal 118 is generated based on the first BTE microphone signal 112 and a first error signal 116. The first error signal 116 is generated by a first subtractor circuit 108 based on a front-of-car microphone signal 114, generated by a front-of-car microphone 104, and the first adapted signal 118. Thus, the adaptive filter 106*a* adjusts the first adapted signal 118, based on the first error signal 116, to be as close to the front-of-car microphone signal 114 as possible.

In another portion of the block diagram, the adaptive filter 106*b* generates a second adapted signal 130. The second adapted signal 130 is generated based on the second BTE microphone signal 124 and a second error signal 128. The second error signal 128 is generated by a second subtractor circuit 126 based on the front-of-car microphone signal 114 and the second adapted signal 130. Thus, the adaptive filter 106*b* adjusts the second adapted signal 130, based on the second error signal 128, to be as close to the front-of-car microphone signal 114 as possible.

The first adapted signal 118 and the second adapted signal 130 are then provided to audio processing circuitry 120. The audio processing circuitry 120 may include components to combine the adapted signals 118, 130, such as mixers and/or filters. The audio processing circuitry 120 may also include amplifiers, equalizers, and/or other components to process the adapted signals 118, 130 prior to playback by the acoustic transducer 110. The processed audio signal 138 generated by the audio processing circuitry 120 is then transformed into audio 140 via the acoustic transducer 110.

Figure 5:
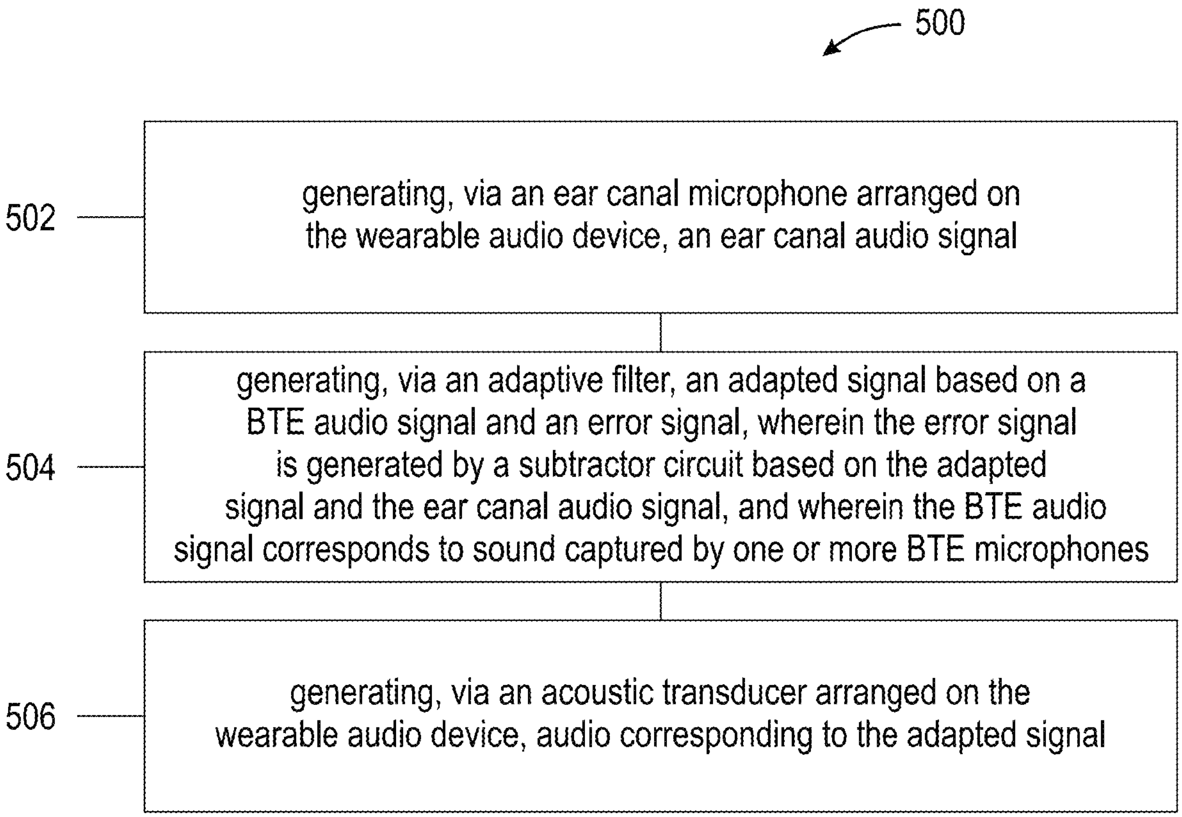
FIG. 5 is a flowchart of a method for capturing and processing audio with a wearable audio device, according to an example.

FIG. 5 illustrates a method 500 for capturing and processing audio with a wearable audio device. The method 500 includes generating 502 a front-of-ear microphone signal. The car canal signal is generated via a front-of-car microphone. The front-of-ear microphone is arranged on the wearable audio device.

The method 500 further includes generating 504 an adapted signal. The adapted signal is generated via an adaptive filter. The adapted signal is based on a BTE audio signal and an error signal. The error signal is generated by a subtractor circuit. The error signal is based on the adapted signal and the front-of-ear microphone signal. The BTE audio signal corresponds to sound captured by one or more BTE microphones.

In one example, the BTE audio signal is a first BTE microphone signal generated by a first BTE microphone. In an alternative example, the BTE audio signal is a microphone array signal generated by a fixed filter. The fixed filter may generate the microphone array signal based on a first BTE microphone signal and a second BTE microphone signal. The first BTE microphone signal may be generated by a first BTE microphone. The second BTE microphone signal may be generated by the second BTE microphone.

The method 500 further includes generating 506 audio corresponding to the adapted signal. The audio is generated via an acoustic transducer. The acoustic transducer is arranged on the wearable audio device.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The above-described examples of the described subject matter can be implemented in any of numerous ways. For example, some aspects can be implemented using hardware, software or a combination thereof. When any aspect is implemented at least in part in software, the software code can be executed on any suitable processor or collection of processors, whether provided in a single device or computer or distributed among multiple devices/computers.

The present disclosure can be implemented as a system, a method, and/or a computer program product at any possible technical detail level of integration. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the “C” programming language or similar programming languages. The computer readable program instructions can execute entirely on the user’s computer, partly on the user’s computer, as a stand-alone software package, partly on the user’s computer and partly on a remote computer or entirely on the remote computer or server. In the latter scenario, the remote computer can be connected to the user’s computer through any type of network, including a local area network (LAN) or a wide area network (WAN), or the connection can be made to an external computer (for example, through the Internet using an Internet Service Provider). In some examples, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions can be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant can be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples can be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A wearable audio device, comprising:
- a behind-the-ear (BTE) microphone configured to generate a BTE microphone signal;
- a front-of-ear microphone configured to generate a front-of-ear microphone signal;
- an adaptive filter, configured to generate an adapted signal from the BTE microphone signal, the adaptive filter being configured to update filter coefficients based on a first error signal derived from the front-of-ear microphone signal;
- a subtractor circuit configured to generate the first error signal as a difference between the adapted signal and the front-of-ear microphone signal; and
- an acoustic transducer configured to generate audio based on the adapted signal.

2. The wearable audio device of claim 1, wherein the BTE microphone is arranged behind an ear of a user.

3. The wearable audio device of claim 1, wherein the front-of-ear microphone is arranged within an ear canal or a concha of a user.

4. The wearable audio device of claim 1, further comprising a second BTE microphone configured to generate a second BTE microphone signal.

5. The wearable audio device of claim 4, wherein the second BTE microphone is arranged behind an ear of a user.

6. The wearable audio device of claim 4, wherein the adaptive filter is further configured to generate a second adapted signal based on the second BTE microphone signal and a second error signal,
- wherein the first error signal and the second error signal are each derived from a same front-of-ear microphone signal.

7. The wearable audio device of claim 6, further comprising a second subtractor circuit configured to generate the second error signal as a difference between the second adapted signal and the front-of-ear microphone signal.

8. The wearable audio device of claim 7, wherein the audio generated by the acoustic transducer is further based on the second adapted signal.

9. The wearable audio device of claim 1, wherein the wearable audio device is a hearing aid.

10. A wearable audio device, comprising:
- a first behind-the-ear (BTE) microphone configured to generate a first BTE microphone signal;
- a second BTE microphone configured to generate a second BTE microphone signal;
- a fixed filter configured to generate a microphone array signal based on the first BTE microphone signal and the second BTE microphone signal;
- a front-of-ear microphone configured to generate a front-of-ear microphone signal;
- an adaptive filter configured to adapt the microphone array signal by adjusting filter coefficients to minimize a difference between an adapted array signal and the front-of-ear microphone signal;
- a subtractor circuit configured to generate an error signal based on the adapted array signal and the front-of-ear microphone signal; and
- an acoustic transducer configured to generate audio based on the adapted array signal.

11. The wearable audio device of claim 10, wherein the first BTE microphone and the second BTE microphone are arranged as a directional microphone array.

12. A method for capturing and processing audio with a wearable audio device, comprising:
- generating, via a front-of-ear microphone arranged on the wearable audio device, a front-of-ear microphone signal;
- generating, via an adaptive filter, an adapted signal from a behind-the-ear (BTE) audio signal;
- generating an error signal as a difference between the adapted signal and the front-of-ear microphone signal,
- updating filter coefficients of the adaptive filter based on the error signal to reduce the error signal; and
- generating, via an acoustic transducer arranged on the wearable audio device, audio corresponding to the adapted signal.

13. The method of claim 12, wherein the BTE audio signal is a first BTE microphone signal generated by a first BTE microphone.

14. The method of claim 12, wherein the BTE audio signal is a microphone array signal generated by a fixed filter.

15. The method of claim 14, wherein the fixed filter generates the microphone array signal based on a first BTE microphone signal and a second BTE microphone signal.

16. The method of claim 15, wherein the first BTE microphone signal is generated by a first BTE microphone, and the second BTE microphone signal is generated by a second BTE microphone.

* * * * *